United States Patent Office.

JAMES O'FRIEL, OF BLAIR COUNTY, PENNSYLVANIA.

Letters Patent No. 76,509, dated April 7, 1868; antedated March 28, 1868.

IMPROVED VITRIFIED COMPOUND.

*The Schedule referred to in these Letters Patent and making part of the same.*

TO ALL WHOM IT MAY CONCERN:

Be it known that I, JAMES O'FRIEL, of Blair county, in the State of Pennsylvania, (post-office address, Springville, Erie county, New York,) have invented, made, and applied to use a certain new and useful Vitrified Compound, for the manufacture of artificial stone goods of a useful or ornamental character; and I do hereby declare the following to be a correct and full description of the same.

The object of my invention is to produce an artificial stone possessing great strength, so that it may be used for fence-posts and other articles that are liable to strain or concussion.

My compound I term the "Iron-Stone," or "*Ferri-Petra.*"

The ingredients I employ are about in the following proportion for each cubic foot of clay: Silex, twelve (12) ounces; muriate of soda, ten (10) ounces; sulphate of iron, eight (8) ounces; sulphate of copper, one and a half ($1\frac{1}{2}$) ounce; alum, three (3) ounces. These weights are given in "troy" ounces.

The four salts above named are to be mixed and thoroughly dissolved in sufficient water to render the clay and silex plastic when mixed therewith.

Care is to be taken that the admixture of the ingredients is thorough and uniform.

The plastic material is to be moulded into any desired shapes, and then dried and baked or burnt similarly to pottery.

The articles made of this compound are very strong and durable, as they are very hard, compact, and tenacious. They will not absorb moisture, and are not injured by exposure to heat, cold, dampness, or dryness; and the texture of this material somewhat resembles that of a metal.

What I claim, and desire to secure by Letters Patent, is—

The composition herein described, prepared in the manner set forth.

In witness whereof, I have hereunto set my signature, this fourth day of September, A. D. 1867.

JAMES O'FRIEL.

Witnesses:
C. O. SEVERANCE,
ROBERT DYGERT.